Nov. 12, 1968  W. C. CARTER II, ET AL  3,411,055
APPARATUS OPERATING AS A FUNCTION OF THE CHANGING DIAMETER OF
A ROTATING ROLL OF TRAVELING STRIP MATERIAL
Filed July 6, 1965

INVENTORS
Woodward C. Carter II
and Curtis L. Ivey.
BY
ATTORNEY

United States Patent Office 3,411,055
Patented Nov. 12, 1968

3,411,055
APPARATUS OPERATING AS A FUNCTION OF THE CHANGING DIAMETER OF A ROTATING ROLL OF TRAVELING STRIP MATERIAL
Woodward C. Carter II, West Seneca, and Curtis L. Ivey, Amherst, Williamsville, N.Y., assignors to Westinghouse Electric Corporation, Pittsburgh, Pa., a corporation of Pennsylvania
Filed July 6, 1965, Ser. No. 469,435
12 Claims. (Cl. 318—6)

ABSTRACT OF THE DISCLOSURE

Torque is applied to the roll by a dynamoelectric machine, and the system has a roll diameter detector including an electromechanical integrator arrangement and an input controller for the integrator, which controller responds to the difference between a voltage proportional to the linear speed of the strip material and a voltage proportional to the product of the roll rotational speed and the mechanical output of the integrator. The integrator changes output whenever this difference is significantly different from zero to return it to essentially zero, thereby keeping the integrator mechanical output position proportional to the roll diameter. A memory feature is obtained by making the controller unidirectional during normal operation. The memory allows the detector to provide an output proportional to roll diameter at all times even when the roll is at standstill, or when the strip breaks. The field flux of the roll drive dynamoelectric machine is regulated in response to the difference between two signals which are respectively functions of the motor field current and of the output of the roll diameter detector.

---

Figure 1:
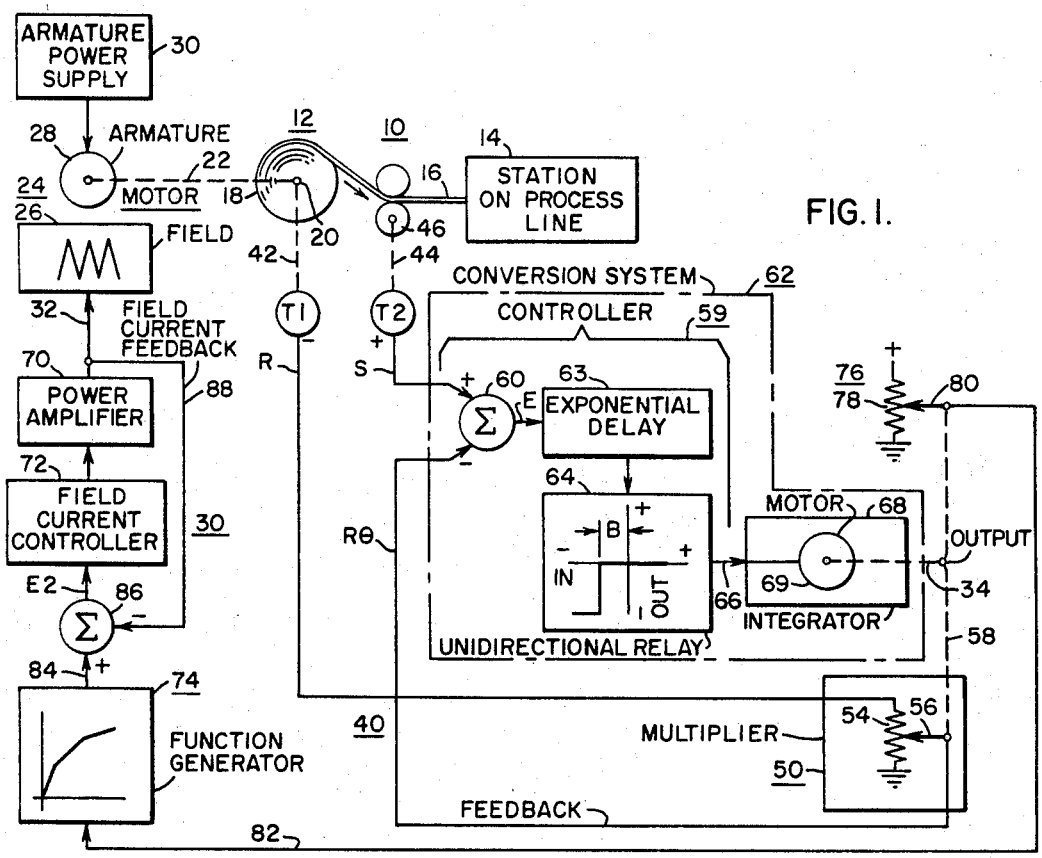

This invention relates to apparatus for detecting the diameter of a roll of elongate material, for example web or strip material, as the diameter changes, decreasing in an unwind roll and increasing in a windup roll. Another aspect of the invention is directed to a control system wherein a condition is controlled as a function of the diameter of such a roll.

Many web process line drives employ core driven unwind and windup rolls to which motoring or generating torque is applied as required. In such arrangements it is desirable that the flux of the dynamoelectric machine which applies the torque be proportional to the roll diameter at all times, including standstill, as when the line is brought to a stop. Heretofore, the practice has been to employ a CEMF (counter-EMF) or current regulator on the core drive. This is not completely satisfactory since a memory device is required to provide standstill performance, and placing the memory device within a control loop increases the system complexity.

Use of the present invention separates the roll diameter determination function from the core drive flux regulating function, providing a more flexible system using two simple subsystems, a roll diameter detector which has a memory, and a field flux regulator. The output of the roll diameter detector of the present invention is proportional to roll diameter at all times (including standstill), and may be used for other purposes in addition to the field flux regulator input, e.g., inertia compensation, taper tension, etc.

It is therefore a principal object of the present invention to provide a novel roll diameter detector.

Another object of the invention is to provide a novel roll diameter detector which has a memory allowing the detector to provide an output proportional to roll diameter at all times, even when the roll is at standstill, or when the strip breaks.

Another object of the invention is to provide for the dynamoelectric machine which applies torque to a changing diameter roll, a novel regulating arrangement including a detector for providing a signal proportional to the diameter of the roll.

A further object of the invention is to provide for the dynamoelectric machine which applies torque to a changing diameter roll, a novel regulating arrangement including a detector for providing a signal proportional to the diameter of the roll at all times including standstill in case the system is stopped for any reason.

In accordance with one embodiment of the invention a roll diameter detector includes an electromechanical integrator arrangement, for example a motor for integrating from input voltage to shaft position, and an input driver or controller for the integrator which controller responds to the difference between a voltage proportional to the linear speed of the strip material and a voltage proportional to the product of the roll rotational speed and the mechanical output of the integrator. The integrator changes output whenever this difference is significantly different from zero to return it to essentially zero, thereby keeping the integrator mechanical output position proportional to the roll diameter. The memory feature is obtained by making the controller unidirectional during normal operation, that is it forces a change in the integration output in response only to increasing roll diameter when used on windups, and only to decreasing roll diameter when used on unwinds. A field flux regulator for the roll drive dynamoelectric machine responds to the difference between two voltages which are respectively functions of the motor field current and of the output of the roll diameter detector.

Other and further objects and advantages of the present invention will become apparent from the following detailed description taken in connection with the drawings wherein a preferred embodiment of the invention is illustrated.

Figure 2:
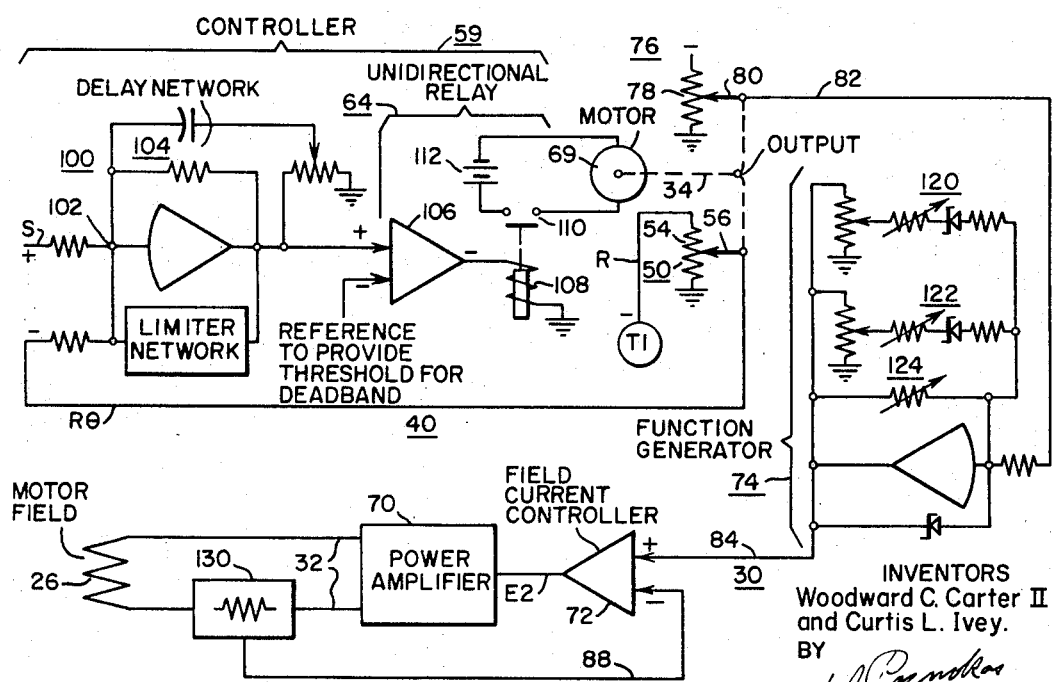

In the drawings:

FIGURE 1 is a block diagram of a control system for controlling as a function of roll diameter, torque applied to a rotatable roll or store of strip material whose (roll's) diameter changes during an interchange of strip between the roll and another station on a strip process line; and FIG. 2 is a diagram illustrating specific examples of components which may be employed in the circuit of FIG. 1.

In the apparatus shown in FIG. 1, a strip material processing line 10 includes stations 12 and 14, between which there is an interchange of a strip 16 of material for example paper web. One of the stations may be either a windup roll or an unwind roll, while the other station may be the opposite type of roll, or it may be a station where an operation other than windup or unwind is performed, for example any of a coating, drying or product forming station. During the interchange, the strip 16 moves from one station to the other so that if one of the stations is a rotatable store or roll of strip material, it either acquires strip if it is operating as a windup roll, or pays out strip if it is operating as an unwind roll. Thus, during the interchange the diameter of the roll changes in one or the other direction, i.e., decreasing or increasing, depending on whether it is operating in the unwind or the windup mode. By way of example station 12 is shown as including a roll or store 18 operating in the unwind mode.

Roll 18 is fixed to a rotatably mounted support such as a core 20 to which torque is applied through a mechanical coupling 22 by a dynamoelectric machine 24, for example the motor shown at 24. The torque applied by the motor 24 to roll 18 may be either motoring or braking torque depending on whether the roll 18 is being operated in the windup or the unwind mode.

Motor 24 includes a field winding 26 and an armature 28, the latter being supplied with power from a suitable source 30. The motor field 26 is supplied with excitation controlled as a function of the diameter of roll 18 by a flux regulator 30 which supplies field current to the motor along an output line 32. Flux regulator 30 is controlled by an input signal which is a function of and derived from the output line 34 of a roll diameter detector indicated generally at 40.

The roll diameter detector 40 in response to linear speed of strip 16 and rotational speed of roll 18 provides at its output line 34 an output manifestation $\theta$ which is proportional to the diameter of roll 18. By way of example, the output 34 is shown as a movable mechanical member and the output signal $\theta$ is relative to the position of the mechanical member.

In connection with the input section of detector 40 there is provided means for supplying respective input signals proportional to the rotational speed of roll 18 and proportional to the linear speed of the strip 16. The roll speed signal may be designated R and is applied along a line also designated R, while the linear strip linear speed signal may be designated S and it is supplied along a line also labeled S. Signal R may be supplied by a tachometer generator T1 driven through a mechanical link 42 coupled to the core 20. The output R of tachometer T1 is thus proportional to the speed of roll 18. The linear speed signal S may be supplied by a tachometer generator T2 driven through a mechanical coupling 44 connected to rotate with a pinch roll 46 that is in frictional engagement with the traveling strip 16. Thus tachometer T2 produces an output S which is proportional to the linear speed of strip 16.

The roll diameter detector 40 includes a multiplier 50 for providing a signal $R\theta$ on a line also indicated as $R\theta$, which signal $R\theta$ is proportional to the product of the roll 18 speed and the output $\theta$. By way of example multiplier 50 is shown as a potentiometer type multiplier including a potentiometer having a resistance element 54 and a movable tap such as a slider contact 56 driven through a mechanical coupling 58 connected to the output line $\theta$. Thus, the position of slider 56 is a function of the output $\theta$. The resistance element 54 is energized by the roll speed signal R. Thus the voltage on the potentiometer arm 56 is proportional to the product of the signal R and the output $\theta$. The output signal $R\theta$ from the potentiometer arm 56 is supplied along a line also labeled $R\theta$.

Signals S and $R\theta$ are supplied to an error generator 60 in the input circuit of a conversion system 62 whose output on line 34 is proportional to the integral of a quantity that is a function of the difference between signals S and $R\theta$. The error generator 60 generates an error signal E proportional to the difference between S and $R\theta$. Error generator 60, which may be in the form of a summing junction as shown, produces an output signal E along a line also labeled E.

After a suitable delay introduced by delay means, for example the exponential delay, indicated at 63, the signal E is applied to a unidirectional relay 64, which when operated applies driving power along a line 66 to an integrator 68 whose output 34 is also the output of the roll diameter detector 40. The integrator 68 may for example be an electromechanical integrator with a mechanical output member whose position varies in accordance with the integral of the input signal applied to the integrator. One example of an electromechanical integrator is an electric motor which integrates from input voltage to shaft position. Such a motor is shown at 69. The output shaft of the motor 69 is at 34 and in the example shown it constitutes the output for each of integrator 68, conversion system 62, and roll diameter detector 40.

The unidirectional relay 64 may have, as indicated, a deadband for stability to prevent false rotation due to tracking errors in tachometers T1 and T2 and feedback potentiometer 50. The exponential delay 63 controls the switching frequency of the unidirectional relay and in particular limits the frequency at which the relay tends to operate to a value compatible with the relay. For example the frequency may be limited to one operation per second or so to permit the use of conventional industrial relays as the power actuating portion of the unidirectional relay circuit.

Conversion system 62, in response to input signals S and $R\theta$, respectively representing linear strip speed and the product of the roll 18 speed and output $\theta$, causes the output $\theta$ to change when there is a difference between the linear speed signal S and the signal $R\theta$, the change being in the direction to reduce the difference to substantially zero thus to keep the output $\theta$ proportional to the diameter of the roll 18. Thus the conversion system 62 is a servo driver in a servo system.

The operation of roll diameter detector 40 may be understood from the following considerations:

Let RPM be the speed of roll 18 in revolutions per minute; FPM be the linear speed of strip 16 in feet per minute; and D be the diameter of roll 18 in feet. Then $\pi D(RPM) = FPM$, and $$\frac{FPM}{RPM} = \pi D$$

Signal R represents RPM and signal S represents FPM, and error signal E equals S minus $\theta R$.

$$E = S - \theta R$$

when $E=0$, then $S=\theta R$.

Neglecting for a moment the exponential delay 62 and deadband B in the relay unit, the error signal E is then the input to an integrator, and therefore during the steady state must be zero, and equation $R\theta = S$ (for E equals zero) is satisfied.

Therefore when $E=0$, $$\theta = \frac{S}{R} = \pi D$$

and $\theta$ is proportional to D.

Motor M will rotate whenever the input voltage to the unidirectional relay exceeds the deadband, which as a practical matter is quite small. The input to the unidirectional relay is therefore substantially equal to the difference between signals S and $R\theta$ and operates the motor 69 whenever this difference is significantly different from zero to return it to substantially zero, keeping the motor shaft position $\theta$ proportional to the diameter of roll 18.

By way of example the conversion system 62 has been shown as being unidirectional. By this it is meant that it will respond to changing diameter of roll 18 in one direction, depending on the mode in which the roll 18 is operating. In the unwind example shown, the conversion system 62 responds only to a decreasing diameter of roll 18. If the roll 18 were operating in the windup mode then the arrangement would be such that the conversion system 62 would respond only to increasing diameter of roll 18. Since the conversion system 62 is unidirectional, it makes the roll diameter detector 40 unidirectional. The relay 64 being unidirectional renders the conversion system 62 unidirectional. However, the roll diameter detector 40 may be rendered unidirectional by any other suitable means, for example the integrator input may be biased unidirectional, or the output of the error generator 60 may be biased unidirectional, etc.

Although the roll diameter detector 40 is shown with a relay controlled servo providing ON-OFF control for the integrator, the controller portion including elements 60, 63 and 64 may be replaced by a continuous controller, for example an operational amplifier having designed therein a summing input, a suitable delay, and unidirectional output.

The field flux regulator 30 includes an output power amplifier 70 driven by a field current controller 72, which is controlled by and responds to an error signal E2 representing the difference between actual field current and a desired field current as represented by the output $\theta$ of the roll diameter detector 40 but as modified by a function generator 74 in accordance with the field current versus field flux relationship (saturation curve) of the motor 24. The function generator 74 is supplied with an input control signal proportional to the diameter of roll 18, for example by means of a potentiometer 76 having a resistance element 78 connected across a suitable power source and traversable by a contact arm 80 mechanically driven by the roll diameter detector output shaft 34 through mechanical linkage 79. Potentiometer arm 80 is connected through a line 82 to input of the function generator 74. The output of function generator 74 is supplied along a line 84 as an input to an error generator 86 for example, a summing circuit which also receives as an input along a line 88, a negative feedback signal proportional to the actual field current supplied to the motor field 26.

The field flux regulator 30 being controlled in response to the output of the roll diameter detector 40, provides to the motor field 26 a field flux which is substantially proportional to the roll diameter as modified by the function generator 74 to fit the saturation curve of the motor. When the field flux is proportional to roll diameter, the surface speed of the roll 18 is roughly proportional to the voltage applied to the armature 28, and the tangential force (tension) exerted by the motor is roughly proportional to armature current.

Besides the example of flux regulation disclosed herein, there are other control areas in which a roll diameter signal may be utilized. For example, such a signal may be employed to adjust the inertia compensation as a function of roll diameter. Such a signal may also be employed to control tension tapering.

Because of the static friction in the motor operated rheostat arrangements formed by the motor 69 and potentiometers 50 and 76, there will be no drift in these arrangements.

The unidirectional feature of the roll diameter detector provides it with a memory. Since the detector will respond only to changing diameter of the roll in one direction, the detector output $\theta$ will represent the current roll diameter at all times including, not only the times when an interchange of the strip between the two stations is taking place, but also in the event of a standstill, or in case of a break in the strip (which may cause uncontrolled random variations in regulating signal input before the process line can be stopped).

In the unwinding mode, for any given linear strip speed, the roll speed increases as the roll diameter decreases. This increases the tachometer T1 output relative to the tachometer T2, thus making the error voltage E some value other than zero and of that polarity to which the relay 64 can respond. As a result motor 69 is driven to move the mechanical output 34 of the integrator 68 to a new position corresponding to a new value of $\theta$. The unidirectional or memory feature prevents a false value of $\theta$ in case of standstill caused by some process interruption. For example, should the strip 16 break between the roll 18 and the pinch roll 46, tachometer T2 would still be indicating a strip speed in the original direction, while the roll 18 could rotate in the direction opposite to its normal mode. In the particular example shown the normal mode is unwind so that after such a break, roll 18 may be driven in the windup direction due to braking torque normally applied to provide operating tension on the strip 16. This would result in a false diameter indication from the output of the roll diameter detector 40 if the detector were not provided with the above described memory. With the unidirectional feature providing the memory the system output $\theta$ would not change in response to input signals, true or false, indicating a changing diameter in a direction opposite to the normal mode of operation. In the example shown where normal operation of the roll is in the unwind direction, the roll diameter detector 40 will not change its output in response to input signals which either truly or falsely represent or indicate roll diameter changing in the increase direction.

Although the invention is not limited thereto, specific examples of components which may be employed in the system of FIG. 1, are illustrated in FIG. 2. Specific examples in FIG. 2 and corresponding functional blocks in FIG. 1 bear the same reference numerals.

In FIG. 2 the controller 59 includes an operational amplifier 100 which provides the functions of the error generator 60 and the exponential delay 63. Additionally it provides, if needed, some amplification. As seen in the drawing, amplifier 100 is provided with an input summing junction 102 and a suitable feedback network 104 for providing exponential delay to limit the switching frequency of the unidirectional relay to a value compatible with the relay.

The unidirectional relay unit in FIG. 2 includes an operational amplifier 106 that provides amplification and a deadband. The output of amplifier 100 is applied as one input to the summing junction of amplifier 106 while a bias or reference to provide a threshold for the deadband is applied as a second input to the summing junction of amplifier 106. As a result, only when the output signal from amplifier 100 overcomes the deadband bias will amplifier 106 produce an output of correct polarity to operate a polarized relay 108 which is a part of the unidirectional relay unit. Relay 108 is provided with a set of normally open contacts 110 in circuit with a battery 112 and motor 69. Relay 108 is polarized to operate and close contacts 110 in response to excitation of only one polarity or sense from the output of amplifier 106, thus providing the unidirectional feature of the roll diameter detector 40. In response to a difference between signals S and R$\theta$, relay 108 is operated to close the contact 110 and drive the motor 69 in a direction to eliminate the difference between signals S and R$\theta$. Relay 108 provides ON-OFF servo control for motor 69.

In FIG. 2 the function generator 74 is shown as an operational amplifier with feedback networks 120, 122 and 124 for generating the differently sloped segments of the output characteristic of the function generator as illustrated within the box 74 in FIG. 1.

The summing junction 86 and field current controller 72 of FIG. 1 are shown as included in an operational amplifier 72 in FIG. 2. The power amplifier 70 may for example be a thyristor (semiconductor controlled rectifier) controlled direct current power supply whose output 32 is connected to the motor field 26. The field current feedback 88 may be obtained by sampling the voltage across a resistor 130 in series with the motor field circuit.

Operational amplifiers are usually signal inverters, and they are so shown in FIG. 2 with regard to relative input and output polarities.

If desired the ON-OFF servo control of motor 69 may be replaced by continuous servo control. This may be effected by operating the motor 69 directly from the output of amplifiers 104 and 106 which should be designed for higher output.

Although the illustrated examples of the roll diameter detector 40 are unidirectional, this is by way of example only, since the invention may be practiced with the detector 40 arranged for bidirectional sensitivity. Detector 40 may be rendered bidirectional for example by making the controller 59 bidirectional so that the output 34 will change in one or the other direction depending on the direction or sense of the difference between signals S and R$\theta$ representing either increasing or decreasing diameter as the case may be. It will be appreciated that when detector 40 is made bidirectional it will not have the memory feature of the unidirectional examples illustrated in FIGS. 1 and 2. The system may be made bidirectional by employing for controller 59, a bidirectional output operational amplifier with suitable amplification as required.

While the systems in FIGS. 1 and 2 are shown for operation of roll 18 in the unwind mode, the system may be altered to operate roll 18 in the windup mode. In either the windup or the unwind modes, tachometers T1 and T2 are arranged to provide oppositely poled signals R and S. In the unwind mode the apparatus is so arranged that as roll 18 unwinds and signal R increases, the error E drives motor 69 in a direction to decrease the signal R$\theta$, thereby to reduce the error and maintain it at substantially zero. However, in the windup mode, the arrangement should be such, that as roll 18 winds up and signal R decreases, the error E drives motor 69 in a direction to increase signal R$\theta$ thereby to reduce the error and maintain it at substantially zero. The above comparisons assume constant linear speed of strip 16.

It is to be understood that the herein described arrangements are simply illustrative of the principles of the invention, and that other embodiments and applications are within the spirit and scope of the invention.

We claim as our invention:

1. In apparatus where in elongate material is interchanged between two stations one of which is a rotatable store of said elongate material which store changes in diameter during said interchange, dynamoelectric means coupled to said store for applying torque thereto, said dynamoelectric means having field means, means for providing a first signal proportional to the rotational speed of said store, means for providing a second signal proportional to the linear speed of said elongate material, servo drive means, said servo drive means including an integrator for providing an output proportional to the integral of the input supplied thereto, means responsive to said first signal and the output of said integrator for providing a third signal proportional to the product of the rotational speed of said store and the output of said integrator, said servo drive means having controller means responsive to said second and third signals for supplying as an input to said integrator a signal proportional to the difference between said second and third signals, whereby when said difference is zero the output of the integrator is proportional to the diameter of said store, means for producing a fourth signal which is a function of the output of said integrator, and regulating means utilizing said fourth signal for controlling the field current of said field means in response to the difference between actual field current and a desired field current, said fourth signal being applied to said regulating means as a reference representing desired field current, said controller means comprising (a) relay means for controlling input to said integrator, (b) error generator means for driving said relay means in response to difference between said second and third signals, and (c) exponential delay means interposed between said error generating means and said relay means.

2. The combination as in claim 1 wherein said integrator is an electromechanical integrator having a mechanical output member whose position varies in accordance with the input applied to the integrator.

3. The combination as in claim 2 wherein said means for providing a third signal comprises a potentiometer across which a voltage is applied by said first signal, and which potentiometer has a movable tap that moves in response to movement of said mechanical output member, said third signal being derived from said tap.

4. The combination as in claim 1 wherein said integrator is an electric motor whose output shaft position represents the integral of a quantity represented by the input voltage applied to the motor, and wherein said relay means, in response to difference between said second and third signals, controls input to said motor to drive the motor in a direction to reduce said difference to zero.

5. The combination of claim 1 wherein said servo drive means is unidirectional whereby the output of said integrator changes only in response to changing diameter of said store in a particular direction.

6. The combination of claim 5 wherein said relay means is unidirectional.

7. The combination as in claim 5 wherein said integrator is an electric motor whose output shaft position represents the integral of a quantity represented by the input voltage applied to the motor, and wherein said relay means, in response to difference between said second and third signals, controls input to said motor to drive the motor in a direction to reduce said difference to zero.

8. The combination of claim 7 wherein said relay means is unidirectional.

9. The combination as in claim 5 wherein said integrator is an electromechanical integrator having a mechanical output member whose position varies in accordance with the integral of the input applied to the integrator.

10. The combination of claim 9 wherein said relay means is unidirectional.

11. The combination as in claim 9 wherein said means for providing a third signal comprises a potentiometer across which a voltage is applied by said first signal, and which potentiometer has a movable tap that moves in response to movement of said mechanical output member, said third signal being derived from said tap.

12. The combination of claim 11 wherein said relay means is unidirectional.

References Cited

UNITED STATES PATENTS 3,223,906  12/1965  Dinger _____ 318—7

ORIS L. RADER, *Primary Examiner.*

B. A. COOPER, *Assistant Examiner.*